(12) United States Patent
Cook et al.

(10) Patent No.: US 10,959,396 B2
(45) Date of Patent: Mar. 30, 2021

(54) AUTOMATIC DOG WASTE APPARATUS

(71) Applicant: Brilliant Pet 2 LLC, Chicago, IL (US)

(72) Inventors: Alan J. Cook, Chicago, IL (US);
Thomas E. Devlin, Winchester, MA (US); Kris W. Grube, Bloomington, IN (US)

(73) Assignee: Brilliant Pet 2 LLC, Chicago, IL (US)

( * ) Notice: Subject to any disclaimer, the term of this patent is extended or adjusted under 35 U.S.C. 154(b) by 35 days.

(21) Appl. No.: 15/449,771

(22) Filed: Mar. 3, 2017

(65) Prior Publication Data

US 2017/0347619 A1    Dec. 7, 2017
US 2020/0329660 A9    Oct. 22, 2020

Related U.S. Application Data

(63) Continuation-in-part of application No. 15/344,209, filed on Nov. 4, 2016.

(60) Provisional application No. 62/351,792, filed on Jun. 17, 2016, provisional application No. 62/345,500, filed on Jun. 3, 2016, provisional application No. 62/250,615, filed on Nov. 4, 2015.

(51) Int. Cl.
*A01K 1/015*    (2006.01)
*A01K 1/01*    (2006.01)

(52) U.S. Cl.
CPC .......... *A01K 1/0117* (2013.01); *A01K 1/0157* (2013.01)

(58) Field of Classification Search
CPC .. A01K 1/0117; A01K 1/0135; A01K 1/0139; A01K 1/01

USPC ........................................................ 119/164
See application file for complete search history.

(56) References Cited

U.S. PATENT DOCUMENTS

| | | | | |
|---|---|---|---|---|
| 2,938,496 A | * | 5/1960 | Wilkerson | A01K 31/04 119/471 |
| 2,983,251 A | * | 5/1961 | Lingis | A01K 1/035 119/479 |
| 3,791,348 A | * | 2/1974 | Marnett | A01K 1/0117 119/482 |
| 3,793,988 A | * | 2/1974 | Traeger | A01K 1/0117 119/164 |
| 4,787,334 A | * | 11/1988 | Bassine | A01K 1/0117 119/165 |
| 5,156,640 A | * | 10/1992 | Del Rosario | A01K 1/0117 119/164 |
| 5,592,900 A | * | 1/1997 | Kakuta | A01K 1/0117 119/164 |
| 6,009,836 A | * | 1/2000 | Neary | A01K 1/0107 119/165 |
| 8,061,300 B2 | † | 11/2011 | McElroy | |
| 8,316,801 B1 | * | 11/2012 | Nottingham | A01K 1/0117 119/169 |
| 8,464,662 B1 | * | 6/2013 | Shorenstein | A01K 1/0117 119/164 |
| 2004/0065265 A1 | * | 4/2004 | Manera | A01K 1/011 119/166 |
| 2006/0225659 A1 | * | 10/2006 | Axelrod | A01K 1/011 119/164 |

(Continued)

*Primary Examiner* — Magdalena Topolski
(74) *Attorney, Agent, or Firm* — J. Miguel Hernandez; James R. Gourley; Carstens & Cahoon, LLP

(57) ABSTRACT

A machine or apparatus to capture dog urine and solid waste for generally indoor use by a dog owner that automatically or manually advances fresh pads on a predetermined programming of the machine by the control module.

7 Claims, 16 Drawing Sheets

(56) References Cited

U.S. PATENT DOCUMENTS

| | | | |
|---|---|---|---|
| 2008/0029043 A1* | 2/2008 | Lawrence | A01K 1/0245 119/501 |
| 2009/0241850 A1* | 10/2009 | Campbell | A01K 1/011 119/164 |
| 2012/0152177 A1* | 6/2012 | Bourget | F21V 23/008 119/267 |
| 2016/0007560 A1* | 1/2016 | Roofener | A01K 1/0117 119/164 |

\* cited by examiner
† cited by third party

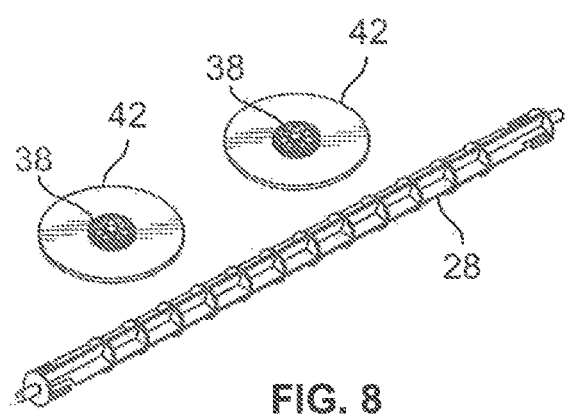
FIG. 8
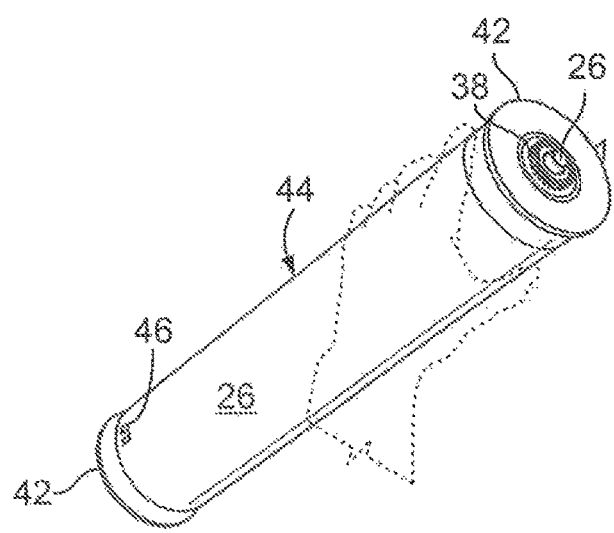
FIG. 9
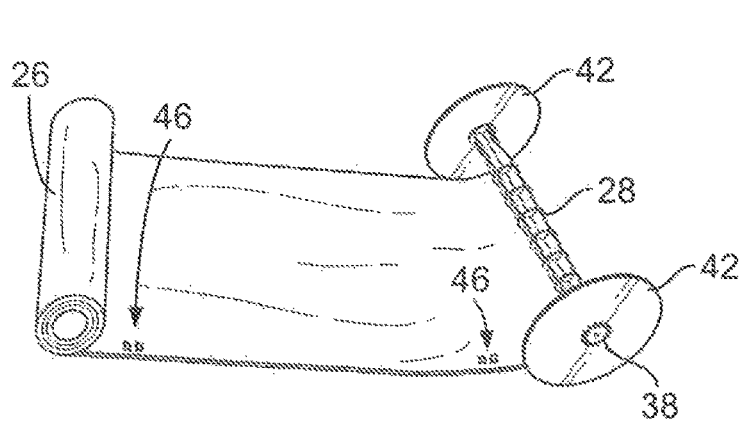
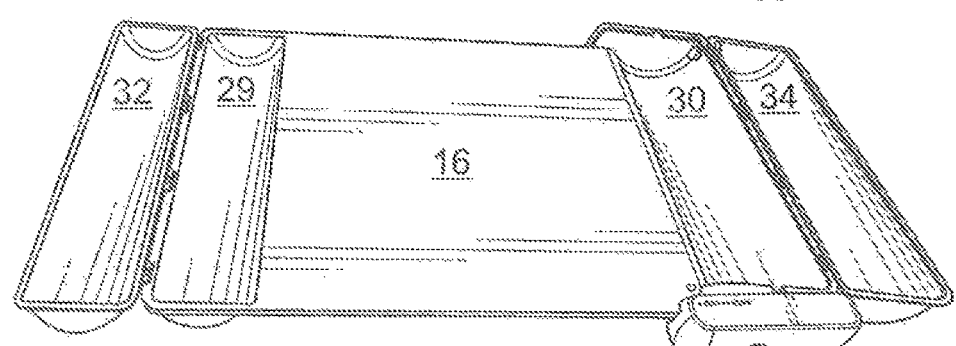
FIG. 10

AUTOMATIC DOG WASTE APPARATUS

CROSS-REFERENCE TO RELATED APPLICATIONS

This present invention is a continuation-in-part which claims priority to U.S. application Ser. No. 15/344,209 filed Nov. 4, 2016 entitled "A Pet Waste Cartridge," which claims the benefit of the following provisional U.S. Applications: U.S. Application Ser. No. 62/250,615 filed Nov. 4, 2015 entitled "Dog Pad," U.S. Application Ser. No. 62/345,500 filed Jun. 3, 2016 entitled "Dog Pad," and U.S. Application Ser. No. 62/351,792 filed Jun. 17, 2016 entitled "Automatic Pad Roll System." This present invention claims priority to the following provisional U.S. Applications: U.S. Application Ser. No. 62/345,500 filed Jun. 3, 2016 entitled "Dog Pad," and U.S. Application Ser. No. 62/351,792 filed Jun. 17, 2016 entitled "Automatic Pad Roll System."

FIELD OF INVENTION

The present invention relates to a removable pet waste cartridge used in combination with a pet waste machine system and, in particular, to a generally removable and disposable pet waste cartridge that disposes of both the waste and its odor that are contained within a generally sealed waste pad when the pad is rolled up in its finished state for removal from the waste machine.

BACKGROUND OF THE INVENTION

There are millions of pet dogs in the United States and the rest of North America. Many dog owners even have more than one dog within their residence in Urban and Rural North America. This large number of dogs excretes a large amount of both liquid and solid waste each day of the year. Due to the busy commitments and work schedules of pet owners, the dogs are left in the residence unattended for hours or days at a time to accommodate work and event schedules of the pet owners. Dogs are known to urinate several times a day and excrete solid wastes at least once daily too. Dog owners want to keep their residences clean and without the attendant odor accompanying either urination or solid waste excrement. Pet owners are also known to teach their dogs or pets to eliminate their bodily wastes on paper within their residences or condition their pets to eliminate their waste outdoors when the pet owner takes the pet for a walk outdoors. Many municipalities have adopted "pooper scooper" laws for sanitary reasons that means pet owners are picking up nasty solid waste on their walks with the pet outdoors.

Outdoor elimination of pet waste can become problematic due to extreme weather conditions found by pet owners in the time allotted to daily walk their pet. If the weather is nasty, the walk often gets postponed or delayed that stresses out the pet. Therefore, housebreaking pads are used by tens of thousands of home owners with their puppies and dogs around the country. Dog owners, especially in large cities where dog parks and available yards are at a minimum, generally prefer to "paper" train their pets. Because of work schedules, some owners may not get home to walk the dog on time, so they "paper" train the pet to use the pads to prevent the dog from eliminating indiscriminately in the house or apartment. Many apartment dwelling dogs, especially among the smaller breeds, are "paper" trained exclusively. Whether they are used for housebreaking for puppies or for "paper" training indoor dogs, who will use these pads throughout their lifetime, housebreaking pads are one of the larger expenditures for dog owners.

In U.S. Pat. No. 8,464,662, describes An Apparatus that maintains housebreaking pads for a pet owner, automatically removing and sealing soiled pads and waste and replacing the soiled pad with a clean pad. The apparatus senses when a pet is using a housebreaking pad, and when the pet is finished, removes and seals the pad and the waste automatically, moving the pad into a repository for later disposal and replacing the soiled pad with a clean pad. The apparatus seals the waste and pad with plastic film having low vapor permeability for disposal on a once-daily or less frequent basis. The apparatus minimizes or eliminates odors associated with canine elimination by removing the pads immediately after elimination is completed, and sealing the waste. A control unit, triggered by a sensor, has a single cycle or a multiple cycle operation, operating a motor that rolls the soiled composite pad onto an arbor in the repository.

Another major problem that plagues pet owners is the annoyance of replacing soiled pads. Offensive odors from the soiled pads may permeate the household. Owners need to flush the feces down a toilet or place in a sealed container to decrease the odor. Dogs, especially puppies, when stressed sometimes develop the undesirable habit of eating their own feces. If the dog develops the habit, the dog owner needs to pick up fecal matter quickly to break the habit. Disposing of the fecal matter and the pads is not only a continual annoyance, but also causes dog owners to bend down multiple times a day, often bothering the lower back and stressing the knees. There is also the possibility that the pet owner will end up with urination or fecal matter on their hands, clothing or other residential items when disposing of open faced pads or paper haphazardly rolled up to contain the pet waste. This is especially burdensome to the elderly, physically handicapped, and blind who have companion, assistance, or guide dogs. The handling of pet waste may also affect the overall health of the elderly person who comes in contact with fecal or urination on their hands and clothing and due to poor eyesight or numbness in their fingers does not realize that the pet waste is still on their hands.

SUMMARY OF THE INVENTION

An object of the present invention is to provide a removable and disposable pet waste cartridge.

A further object of the present invention is providing a removable pet waste cartridge where a pet owner avoids touching the pet waste at time of disposing of a spent pet waste cartridge.

Another object of the present invention is to provide a pet waste cartridge that seals in the liquid and solid pet wastes when the waste pad is rolled up into a final state for disposal.

A removable waste cartridge in combination with a pet waste machine comprises a pad in a roll of a predetermined diameter, length and width having an absorbent front side and a back side of non-permeable material. A take-up rod passes through the axis of the pad during its take-up on the rod. A pair of end caps is mounted at opposing ends of the rod for guiding the take-up function of the soiled portion of the pad. The pad roll of the waste cartridge is placed in a supply assembly at one end of the waste machine to have one end of the roll stretched across a pet bed on the machine for a connection to a take-up rod with a pair of end caps mounted on opposing ends of the rod that is located in the take-up assembly during operation of the machine.

Further, the waste machine advances the roll of pads either manually or automatically after pet waste is deposited and then observed, or automatically detected on the pad until the entire roll of pads is wound around the take-up rod and ready for disposal with the end caps holding the pet waste and attendant odor therein.

Moreover, a pet waste removable cartridge for use with a pet waste machine comprises a take-up core of a predetermined diameter, length and width. The roll of waste pad formed by winding a flexible material around the core, said roll of waste pad having an absorptive waste surface on one side and a non-permeable surface on the other side; and a pair of generally cylindrical end caps although the end caps are capable of other shapes as a square or other shapes between a circle and a square mounted on opposing ends of the core for guiding the rolling of the pad around the core during the take up of the waste pad when winding it around the core. The pet waste removable cartridge includes a take up core or rod passing through the axis of the rolled up waste pad in the take-up assembly.

The pet waste removable cartridge has one end of the waste pad attached to the rod by tape by holes in the pad fitting over corresponding pins mounted on the rod, by feeding the pad through a slot in the rod including a tapering of the pad to facilitate the feeding of the pad through the slot or by feeding the pad under one or more clips integrally formed on the rod or integrally formed on the end cap. The pet waste removable cartridge includes the end caps to seal or partially seal exposed ends of the rolled up waste pad to contain the odor and waste therein.

The pet waste removable cartridge with at least one end cap provides an interface with the waste machine for manual or automatic advancement of the waste pad therethrough. The waste pad is capable of manually being advanced from the supply assembly to the take-up assembly by a handle crank mechanically connected to the rod or by a toot treadle that is mechanically connected to the rod when stepped upon or a foot roller mechanically connected to the rod for its rotation. The pet waste removable cartridge requires the take-up core to interface directly to a mechanism for manual or automatic advancement of the waste pad with or without the end caps.

The pet waste removable cartridge includes a waste pad with a series of marks for detection by waste machine to determine pad status in the machine. For example, the end user requires information about how much waste paper or pad is left in the supply assembly. Also, when a new roll is installed to replace a spent one, the machine needs to know that a new roll of waste paper is installed. And there are many more signals to the machine by how the series of mark or holes or notches on the paper are capable of indicating or configuring the machine with its electronic control components and drive motor within the control module.

A roll of pet waste paper for use with a waste machine comprises a waste pad or paper with an absorbent front side material and a non-absorbent hack side. This configuration of the roll of waste paper prevents leakage of urine and feces from the pet through the waste paper. The marks on the roll of waste paper further alerts the end user of various states of the roll of waste paper as it is consumed by manual and automatic advancement through the machine per a designed program entered into the control module by the end user. The mark on the waste paper provides information for determining future use or information on how to set up the machine for future use by the end user. The marks on the pet waste paper are printed on either the front or back sides of the waste paper. In addition, the marks on the pet waste paper are either visible or invisible on the front or back sides of the waste paper. The marks on the pet waste paper are absorptive or reflective to infrared light, UV light or other light spectrums. The marks on the pet waste paper are often printed at predetermined spaced intervals or at variably spaced intervals usually at one of the edges along a length of the paper. The marks on the pet waste further include holes or notches on the paper that replace or add to the marks on the waste paper. The pet waste paper includes an absorptive non-woven spun bond on a top layer for tear resistance, an absorbent polymer in a middle layer and a plastic non-absorbent bottom layer for leak protection from the liquid and solid waste.

An apparatus for receiving, removing and sealing a pet waste within a roll of pads comprises a pet waste station having a generally flat parallel surface with respect to a floor and at a predetermined heights above the floor for a pet to easily step from the floor onto the waste station in order to urinate or leave solid waste behind on a portion of the exposed roll of pads laying across the flat surface of the waste station that becomes soiled by the pet waste; a supply housing for holding a fresh supply of roll of pads therein connected to one end of the waste station; and a take up housing-connected to an opposing end of the waste station for rolling up and sealing the soiled roll of pads for disposal; and The roll of pads are defined as a continuous roll of a laminate material of at least a single ply of a super absorbent material or waste paper which one side is an impervious backside or bottom of a polymer or plastic that has the printed markings thereon that are readable by an infrared sensor mounted on the control module that looks through a slot in the machine to read the markings arranged in a pattern to provide information about the advancement of the waste paper through the machine or apparatus. The thin waste paper to collect dog urine and solid wastes could range from a single layer to five layers.

The system includes An apparatus having predetermined cycles for automatically removing a pet soiled pad and replacing the removed soiled pet pad with a fresh pet pad to minimize the odor from the soiled pad comprising a pet waste platform configured to be a predetermined height above the floor and to be a predetermined width and length; a supply housing for receiving a fresh roll of pads located at one end of the length of the platform having a generally cylindrical or geometric trough shape with a bottom half generally below the waste platform and a cover top half for securing the fresh supply of pads within the supply housing; a take up housing for receiving the soiled roll of pads located at the other end of the length of the platform having a generally cylindrical or geometric trough shape with a bottom half generally below the waste platform and a cover top half for securing the soiled roll of pads within the take up housing; a take up assembly connected to an end of the first fresh roll of pads in the take up housing for winding the soiled roll of pads around a rod in the take up assembly; a motor having a drive shaft mechanically or an electrically located or coupled, respectively, to the rod for advancing a pad across the waste platform in a predetermined manner; and a controller with inputs from a sensor connected to the apparatus or from an end user to activate the motor to advance the pad either a fall-length or a fractional-length of the platform in response to the condition of the roll of pads with elapsed time or set delayed of time or wetness or liquid thereon or location of the pet or other known factors.

A pet pad for capturing liquids or solid wastes comprises a roll of a laminate pad material capable of receiving and absorbing liquids or solid wastes having a predetermined diameter, length, width and thickness configured to be stretched across a pet waste bed from a supply end to a take up end of an automatic or a manual pet waste machine; and at least one marking on a flat surface of the laminate pad material for determining usage of the pad material by the machine. A system that senses the presence of waste and then advances the pad forward to the take up assembly until the pad on the surface platform is sensed to be clean. So the marks could be also located anywhere on the pad and not only on the edge of the pad.

A pet laminate for collecting urine and solid wastes comprising a. a roll of laminate material with at least one absorbent layer; a series of markings in a pattern along an edge of the laminate for providing information about the use of the laminate material; and b. a sensor on a pet machine having a pet platform to collect wastes for reading the markings pattern on the laminate material passing across the pet platform to provide the machine with an indication of how much paper to advance.

BRIEF DESCRIPTION OF THE DRAWINGS

Embodiments of the present disclosure are described by way of following drawings pointing out the various details to the inventive automatic or manual pad roll system. The main features and advantages of the present disclosure will be better understood with the following descriptions, claims, and drawings, where:

FIG. 8 is a diagrammatic perspective view of the components in the waste cartridge of the invention.

FIG. 9 is a waste cartridge ready for disposal of the invention.

FIG. 10 is a diagrammatic perspective view of the waste cartridge components ready for installation into the waste machine.

DETAILED DESCRIPTION

Figure 1:
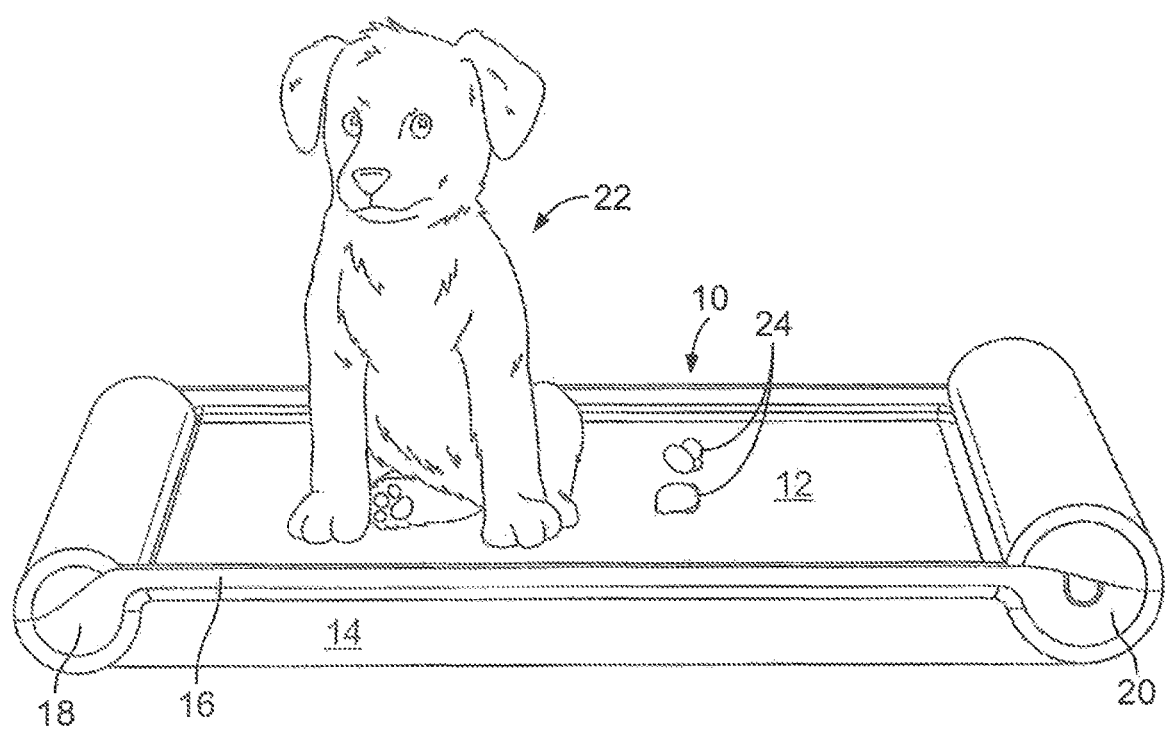
FIG. 1 is a diagrammatic perspective view of the invention demonstrating a pet eliminating on a roll of waste pads.
Figure 2:
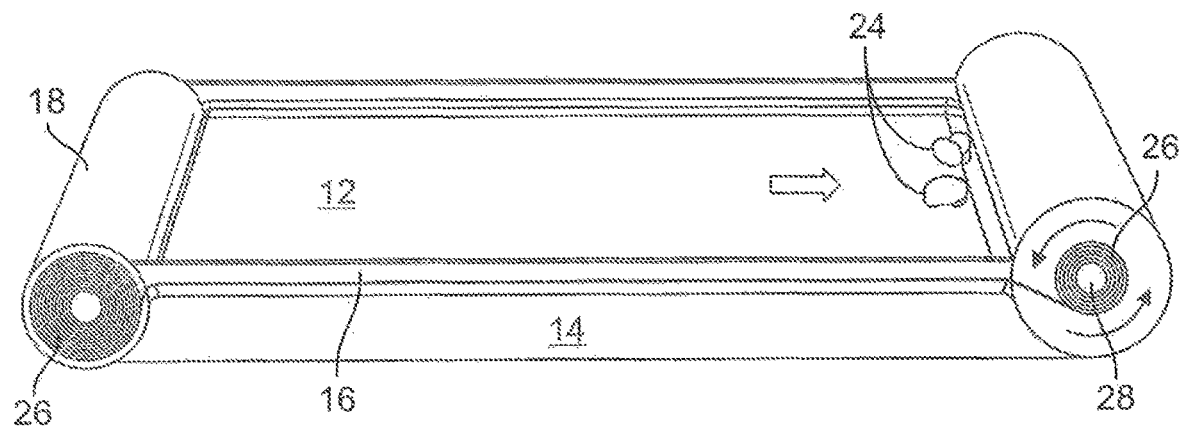
FIG. 2 is a diagrammatic perspective view of the invention with a partial elevation cut away showing the roll of waste pads in the supply assembly stretched across the pet bed to a take-up rod in the take-up assembly which shows a repository portion of the invention.
Figure 3:
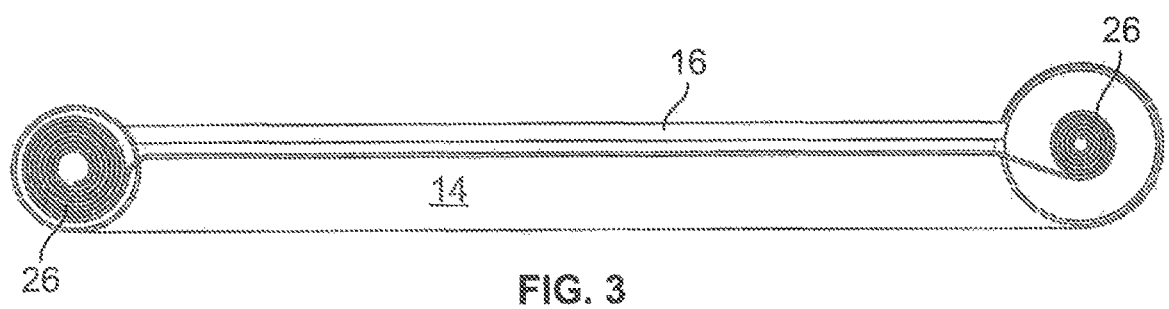
FIG. 3 is a diagrammatic side elevation view of the invention with a partial elevation cut away showing the roll of waste pads in the supply assembly stretched across the pet bed to a take-up rod in the take-up assembly which shows a repository portion of the invention
Figure 4:
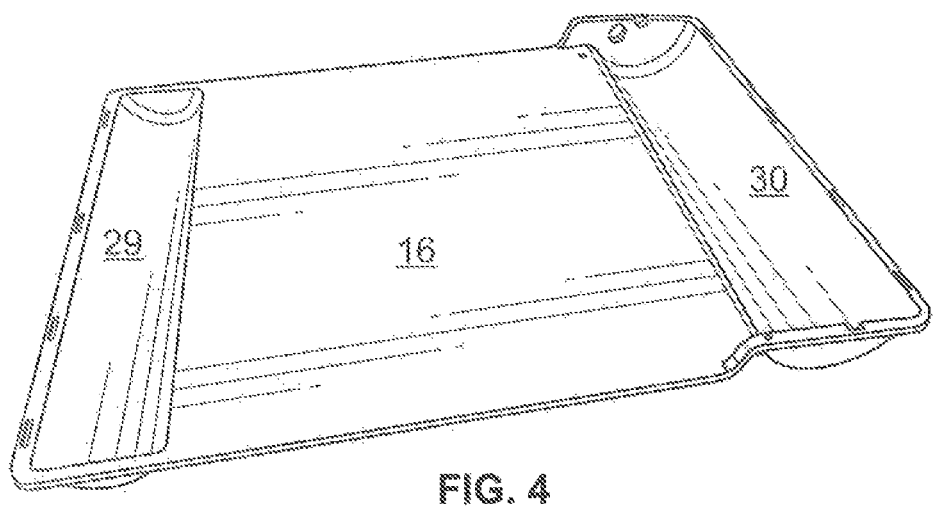
FIG. 4 is a diagrammatic perspective view of the invention showing the lower portion of the machine and the pet bed for receiving a pet roll of waste pads therein.
Figure 5:
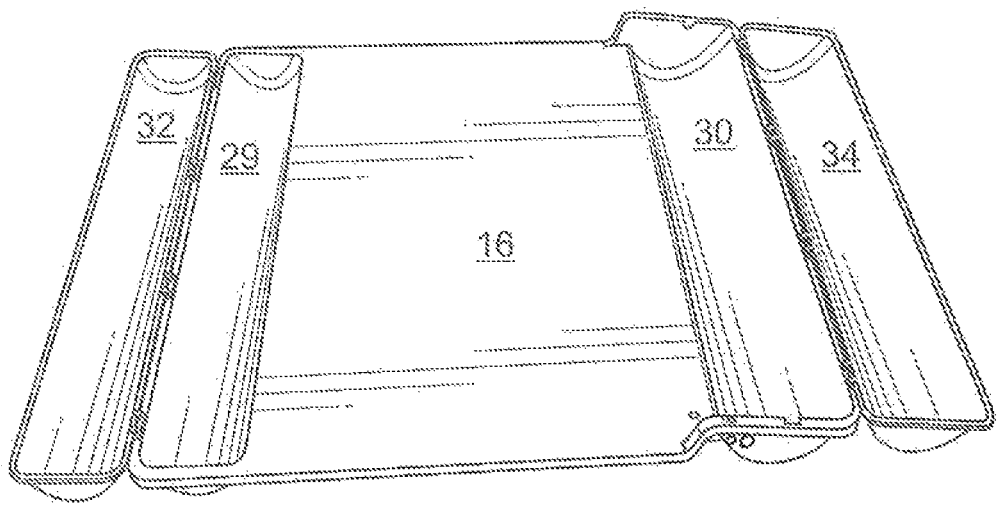
FIG. 5 is a diagrammatic perspective view of the invention showing the machine with the supply and take-up assembly covers open for receiving a pet roll of waste pads therein.

FIG. 1 illustrates an automatic or manual waste cartridge in combination with a waste machine system 10 with a waste pad 12 for later disposal with a pet 22 eliminating solid waste 24 on the pad 12. The apparatus or machine 14 detects the pet 22 eliminating solid waste 24 and when the pet 22 leaves the apparatus 14, the apparatus 14 automatically cycles the replacing of that portion of the soiled pad with a clean new portion from the pad roll 26 by removing and sealing the soiled portion of the pad 12 in a take-up assembly 20 and feeding a clean portion of the pad roll 26 from a supply assembly 18. The apparatus is programmed to have a stage interval where the pet 22 stands on the portion of exposed pad 12 on a pet bed 16, the stage interval is followed by a repository interval as shown in FIG. 2 where the apparatus 14 removes and seals the soiled portion of the pad 12 with the solid waste 24 and any urine in the take-up assembly 20 wherein the take-up rod or core 28 rotates in a counterclockwise direction to take up and sealed the soiled pad wound around the rod 28 within the take-up assembly 20 for later removal and then disposal.

The repository portion is aesthetically covered by a cylindrical half portion of the machine 14 attached to the pet bed 16 with a rotatable cover 34 in the take-up assembly 20 to hide the soiled portion 12 of the pad roll 26. The elimination stage portion for the pet 22 has the machine bed 16 connected between the supply and take-up assemblies 18 and 20, respectively, where the waste pad portion 12 there between is set on top of the pet bed 16, The pet 22 stands on top of the pad portion 12 on the pet bed 16 and eliminate feces 24 and urine. The supply assembly also has a rotatable cover 32 with a lower cylindrical portion 29 for receiving the pad roll 26 of a predetermined length, width and diameter. The pad roll 26 when housed within the supply assembly 18 has its axis below the pet bed 16 and the waste pad portion stretched across the bed 16 to the take-up rod 28 is below the pet bed 16 to create the proper friction and tension of the pad 12 across the bed without jamming or hampering the take-up of the soiled portions of the pad roll 26 within the take-up assembly 20 and to provide taking up the soiled pad without any part of the machine contacting the top, soiled surface of the pad. The covers 32 on the supply assembly when closed further provides the proper tension on the waste paper or pad portion 12 moving across the bed 16 from the supply to the take-up assemblies, respectively, as shown in FIGS. 1, 2, 3, and 26.

Figure 19:
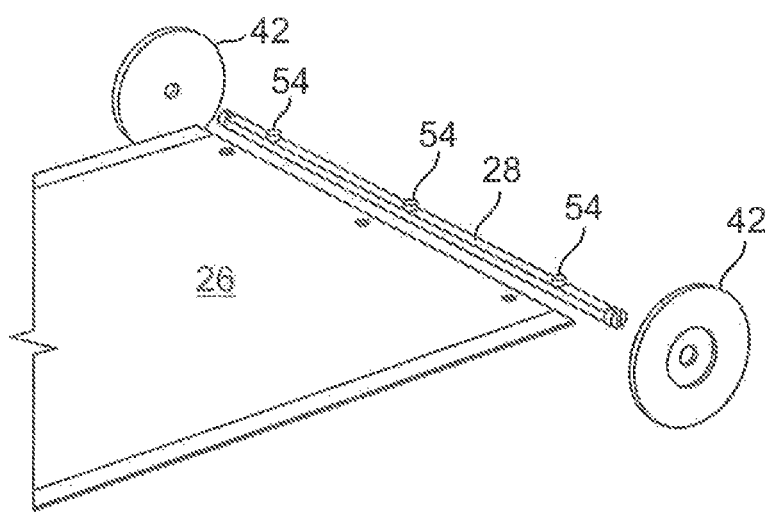
FIG. 19 is a diagrammatic perspective view of the invention showing the attachment of the one end of the pad with holes to pins on the take-up rod.
Figure 24:
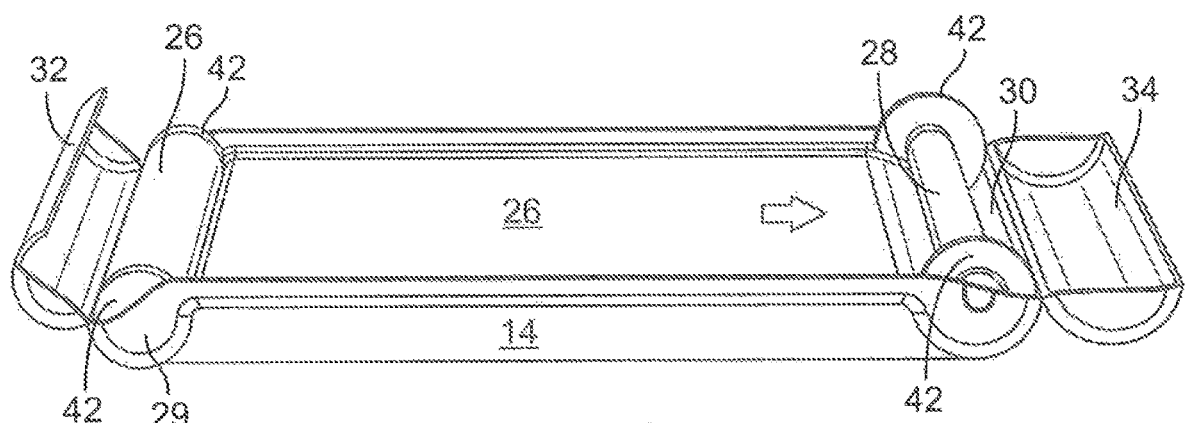
FIG. 24 is a further diagrammatic perspective view of the invention with the covers on the supply and take-up assembly opened showing the installed waste cartridge therein.
Figure 25:
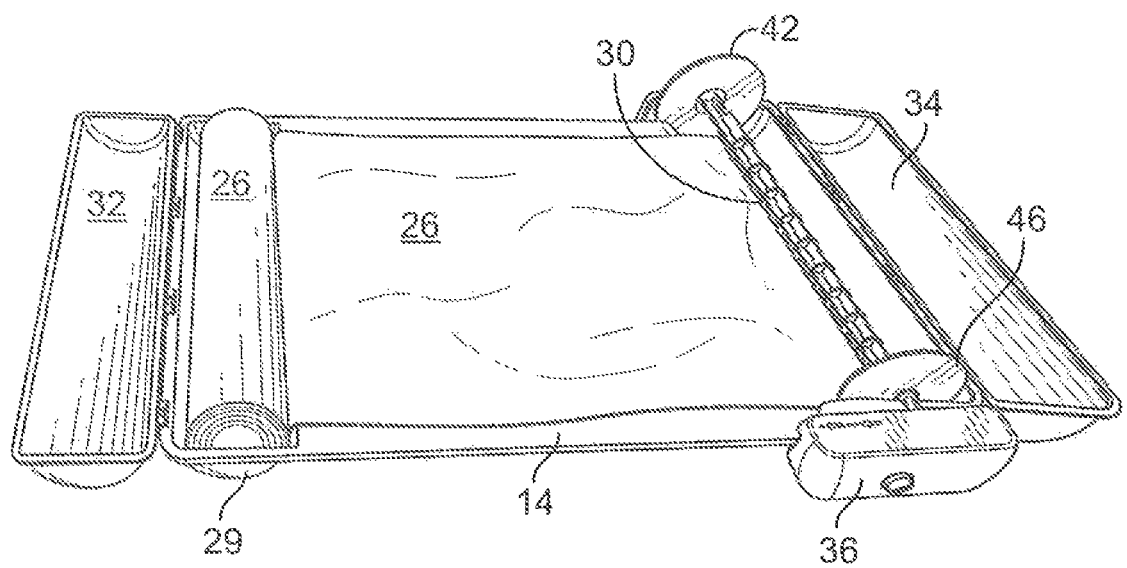
FIG. 25 is another diagrammatic perspective view of the invention with the covers on the supply and take-up assembly opened showing the installed waste cartridge therein.
Figure 26:
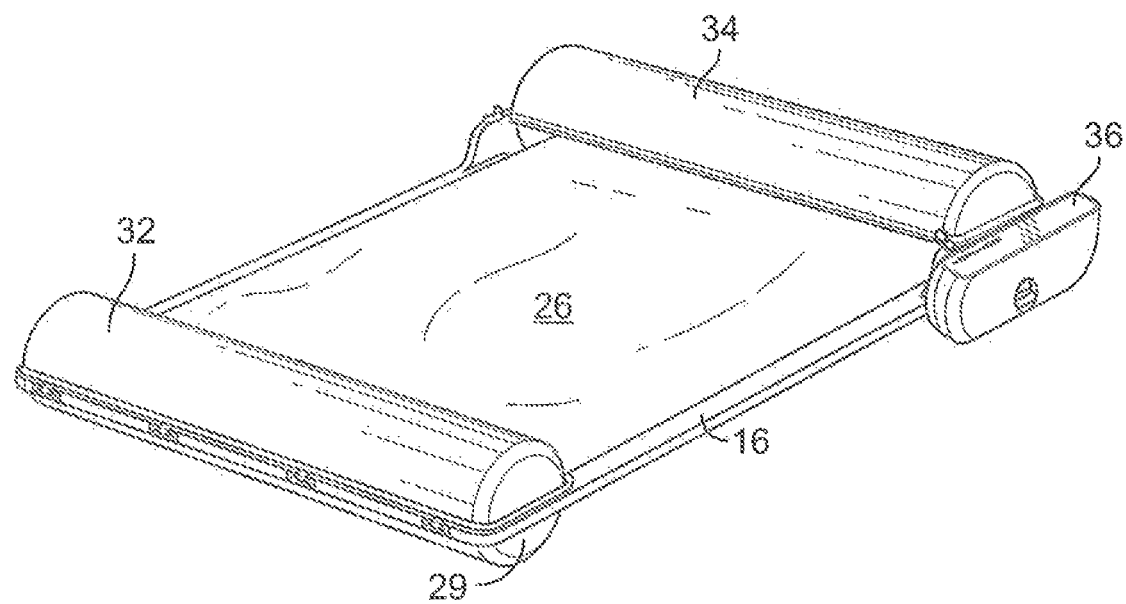
FIG. 26 is a diagrammatic perspective view of the invention with the covers on the supply and take-up assembly closed showing the installed waste cartridge and machine ready for a pet elimination.
Figure 27:
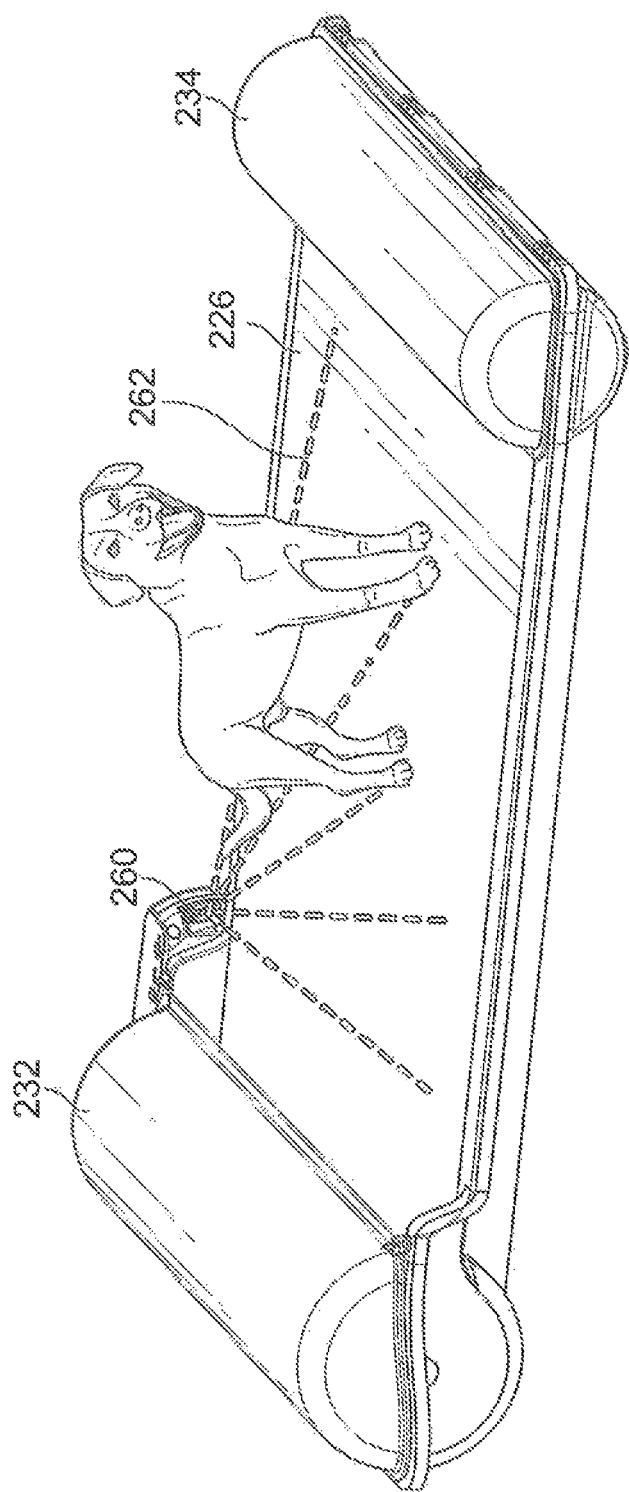
FIG. 27 is a diagrammatic perspective view of a dog on the machine being viewed by infrared or other type of sensor according to the present invention.
Figure 28:
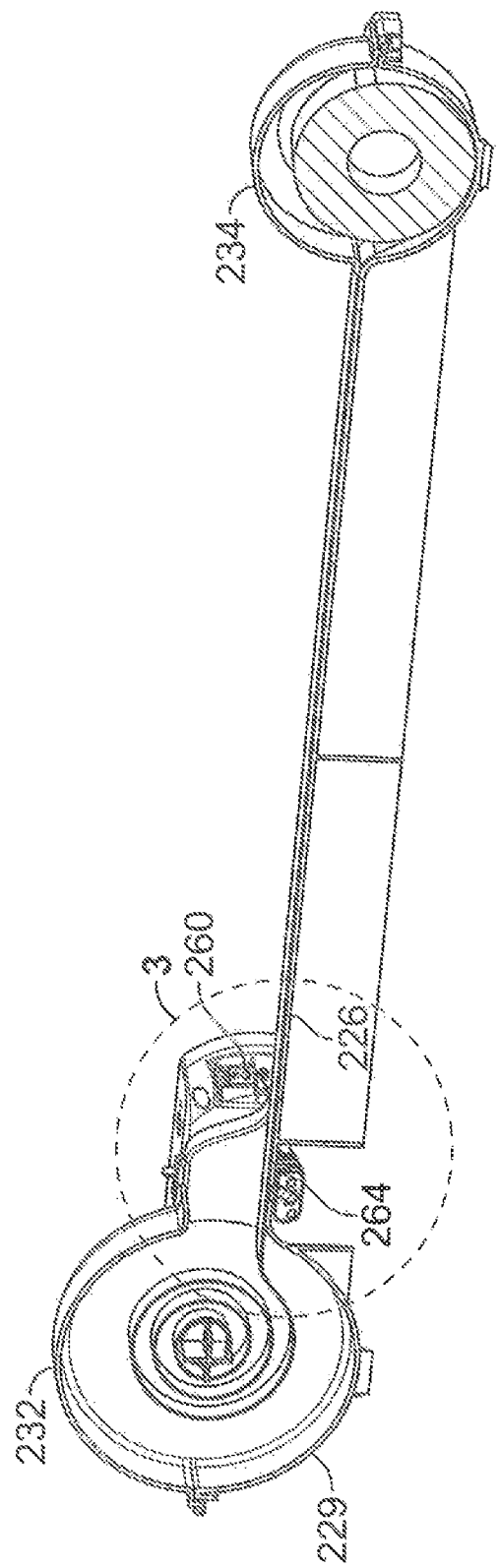
FIG. 28 is a diagrammatic perspective view of a both infrared sensors on the machine according to the present invention.
Figure 29:
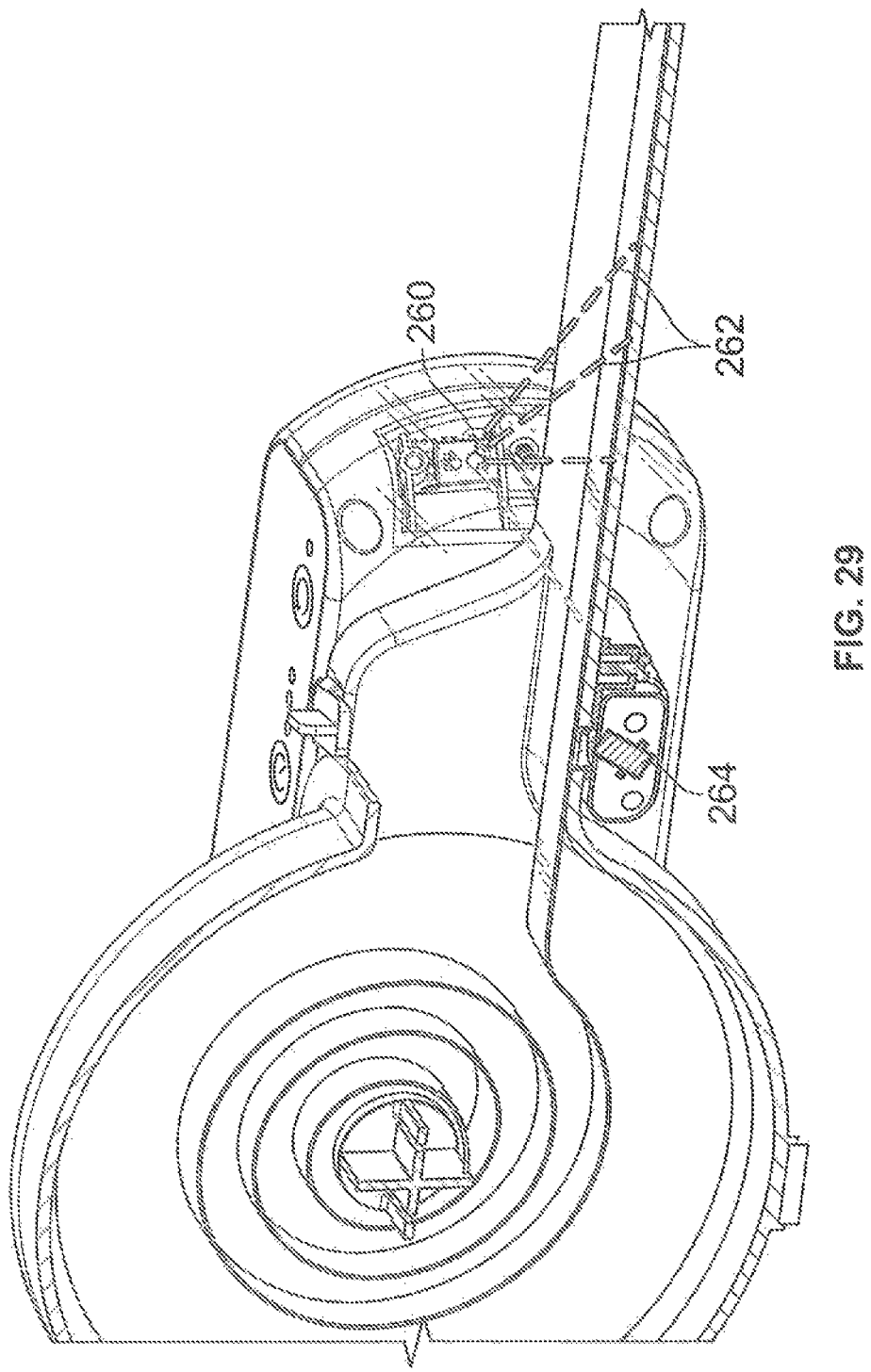
FIG. 29 is a diagrammatic perspective closer view of a both infrared sensors on the machine according to the present invention.
Figure 30:
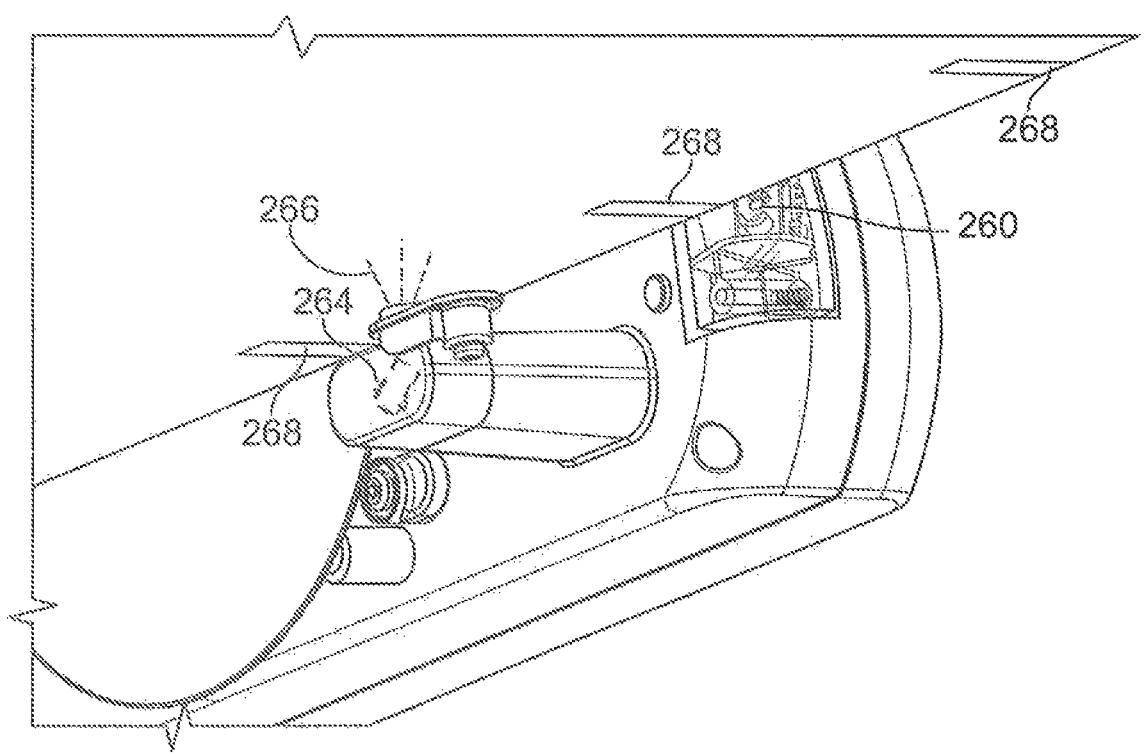
FIG. 30 is a bottom diagrammatic perspective view of both infrared sensors on the machine according to the present invention.
Figure 31:
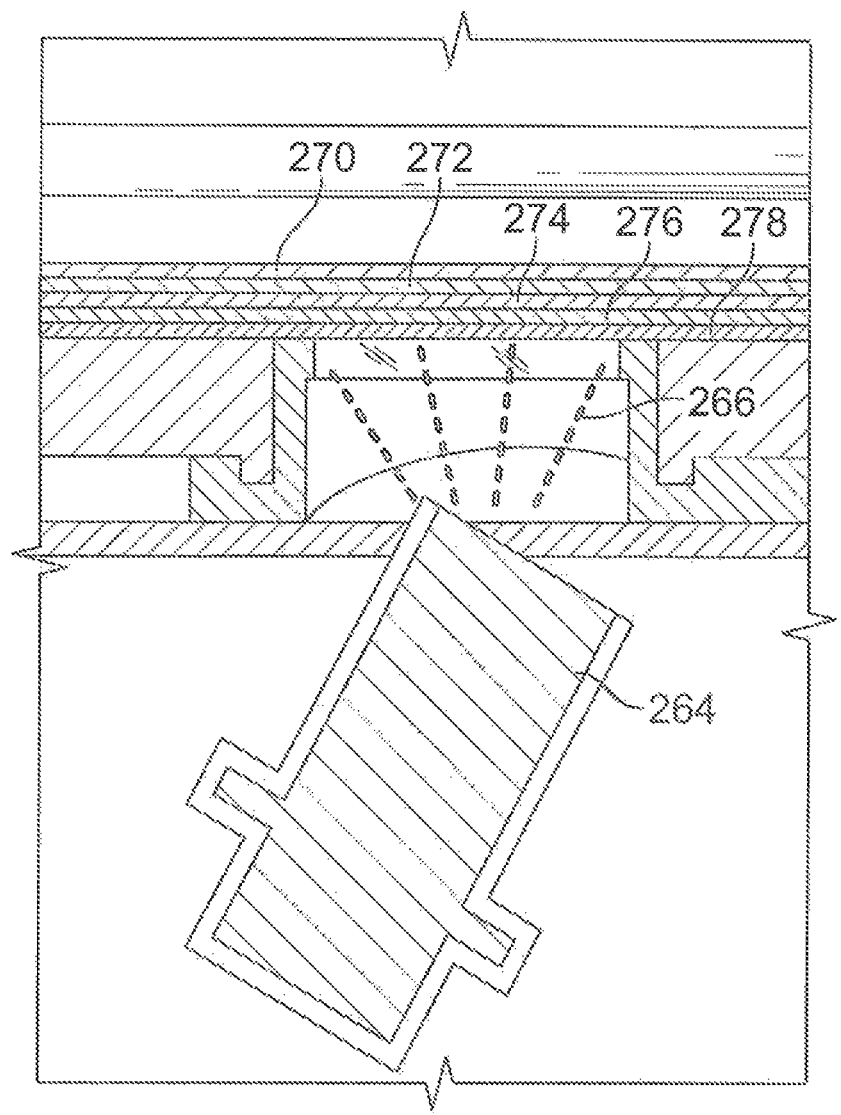
FIG. 31 is a diagrammatic perspective view of a multiply waste paper or pad material used with the machine or apparatus according to the present invention.

FIGS. 8-10 illustrate a waste cartridge 44 and its components as follows: a core or rod 28, a pair of end caps 42 connected by a press fit to the opposing ends of the rod 28. The end cap often includes a gear 39 to mesh with corresponding teeth on a gear 38 on the drive shaft connected to the drive with a removable control and drive module 36 that is key fitted with a pair of guide pins 40 to the side of the take-up assembly where the gear 38 extends through one side of the take-up assembly to engage the identical meshing teeth on the gear 39 on the end cap to rotate the take-up rod or core 28 in a counterclockwise rotation as shown in FIG. 2. The pad roll 26 is connected by holes at one end of the pad roll as shown in FIG. 19 press fitted over pins 54 on the rod 28. The one end of the pad roll 26 is capable of being fed through a slot in the rod 28 as shown in FIGS. 9 and 24 wherein the pad roll 26 is installed in the cylindrical half 29 of the supply assembly and the take-up rod 28 with the one end of the pad roll 26 inserted through a slot on the rod 28 and attendant end caps 42 are inserted into the cylindrical half base 30 whereupon the covers 32 and 34 are closed and the first portion of the fresh waste pad 12 is stretched across the bed 16 as shown in FIGS. 1, 2, 3, 25 and 26.

As further shown in FIG. 9, marks 46 are on the pad border for the machine to read and provide information depending on the spacing and interval of the marks 46 thereon information such as the amount of the roll left for use or a fresh roll was just installed is the type of information available from these marks on the waste paper and pad roll.

FIGS. 11-18 show the installation of the waste paper on the take-up rod 28 from stretching the waste paper 12 from the pad roll 26 across the bed 16 to the take-up rod 28 and the use of clips at one end of the take-up rod 28 wherein a right angle nib 50 provides friction against the paper when inserted underneath a pair of clips on one end of the rod 28 or under a pair of clips on opposing ends of the rod. The nib 50 with the friction engagement makes sure that the waste paper 12 does not slip off the clips on the first several counterclockwise turns of the rod within the housing of take-up assembly 20.

Figure 20:
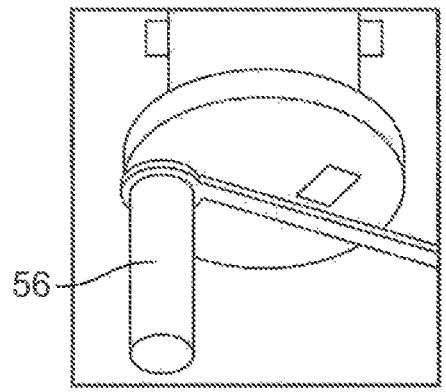
FIG. 20 is a diagrammatic perspective view of the invention showing a hand crank mechanically connected to the take-up rod in the take-up assembly.
Figure 21:
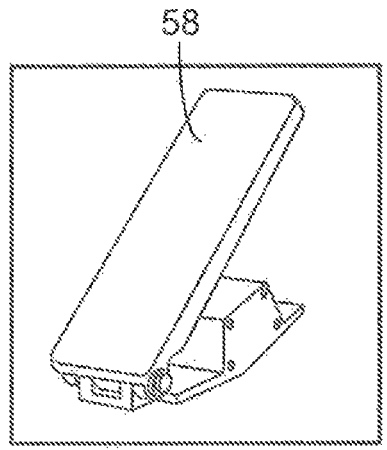
FIG. 21 is a diagrammatic perspective view of the invention showing a foot treadle mechanically connected to the take-up rod in the take-up assembly.
Figure 22:
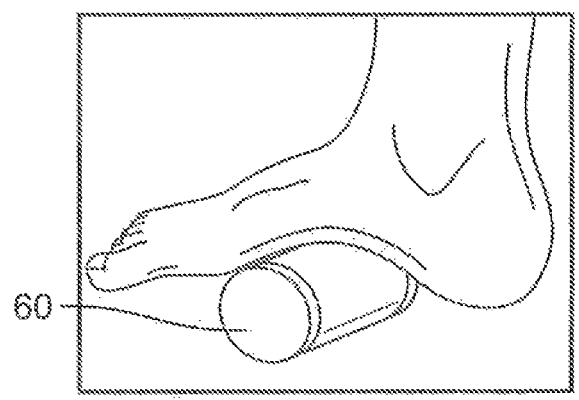
FIG. 22 is a diagrammatic perspective view of the invention showing a foot roll mechanically connected to the take-up rod in the take-up assembly.
Figure 23:
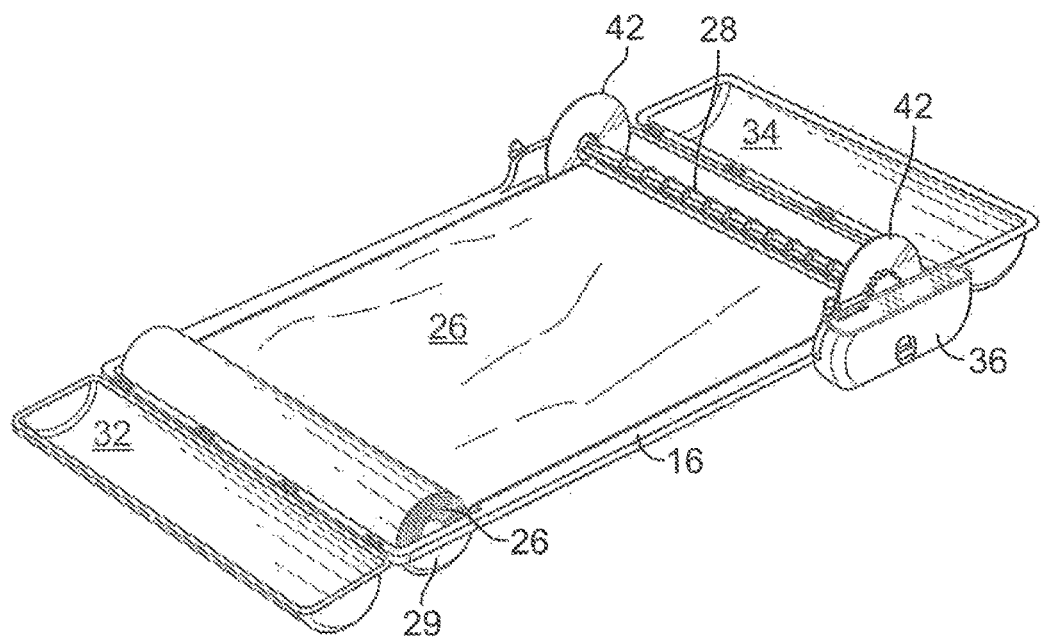
FIG. 23 is a diagrammatic perspective view of the invention with the covers on the supply and take-up assembly opened showing the installation of a waste cartridge therein.

In FIGS. 20-22 illustrate manual advancement of the waste paper across the bed 16. A handle crank that is mechanically connected to the rod 28 to advance the soiled pad 12. A treadle 58 is shown in FIG. 21 which is stepped on to advance the pad, and FIG. 22 shows a foot roll mechanically connected to the rod 28 to advance the pad and take-up the soiled portion of the pad on the pet bed 16 after pet 22 eliminate its waste.

Figure 6:
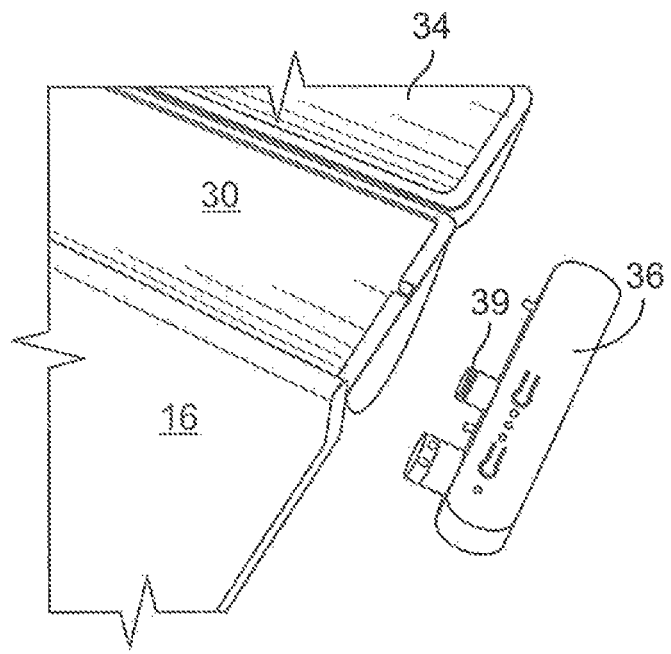
FIG. 6 is a diagrammatic perspective view of the invention demonstrating the attachment of a removable control and drive module connection to the take-up assembly.
Figure 7:
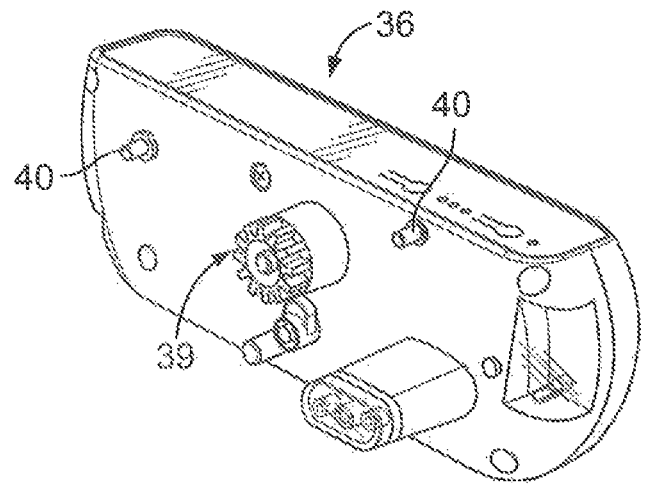
FIG. 7 is a diagrammatic perspective view of the invention demonstrating a removable control and drive module of the invention.
Figure 11:
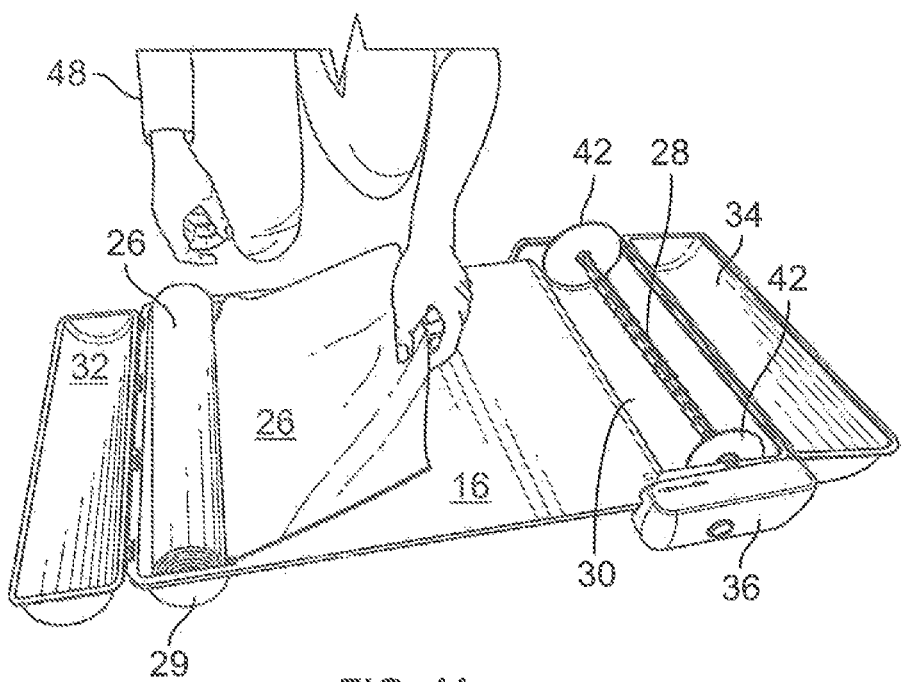
FIG. 11 is a diagrammatic perspective view of the invention with a roll of waste pad being installed on a waste machine.
Figure 12:
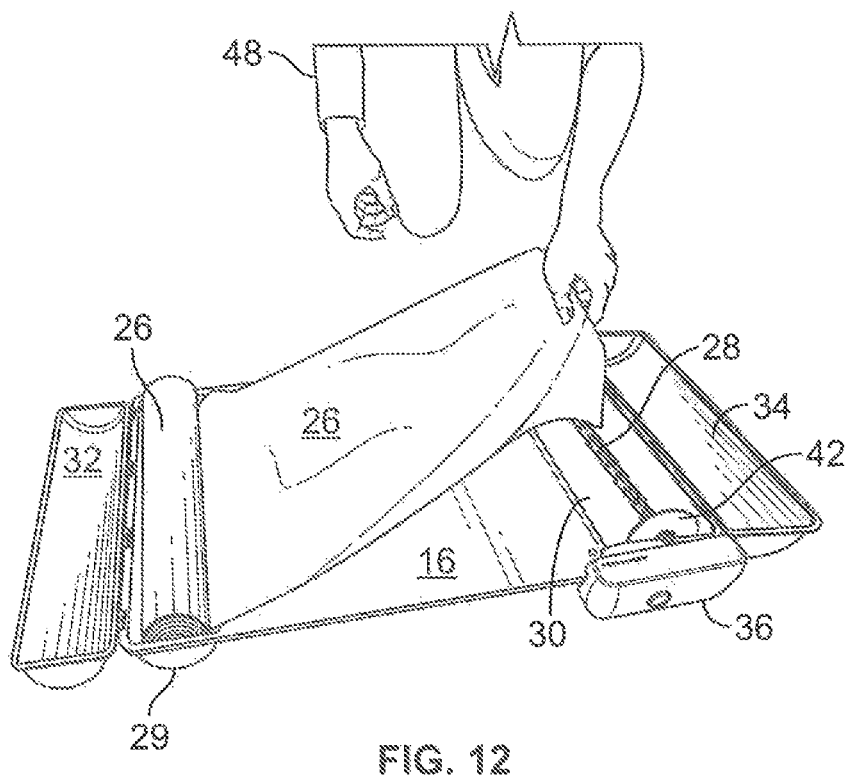
FIG. 12 is a diagrammatic perspective view continuation of the invention with a roll of waste pad being installed on a waste machine.
Figure 13:
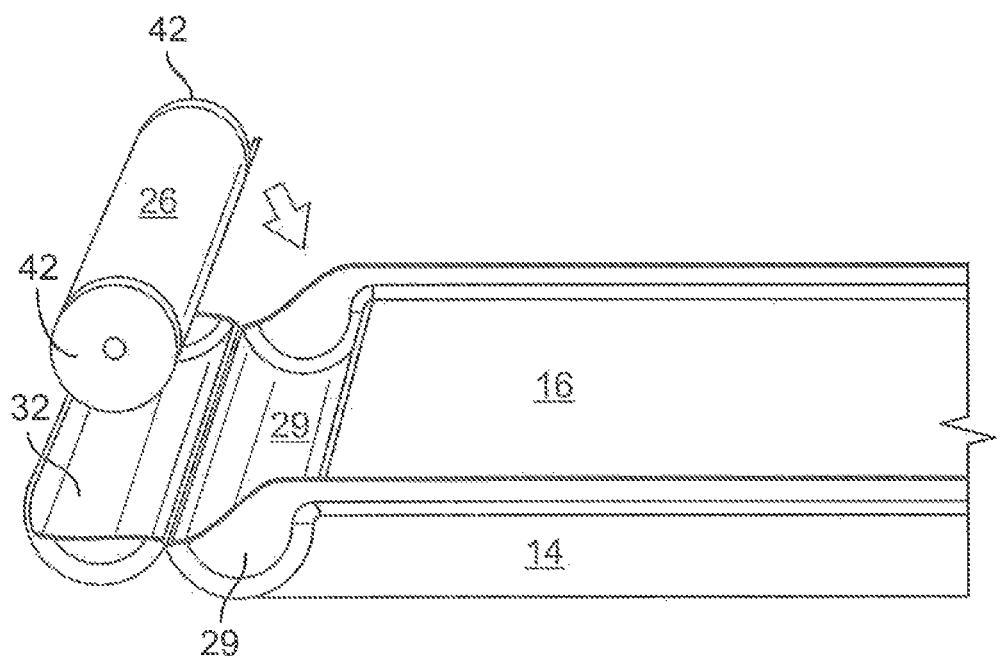
FIG. 13 is a diagrammatic perspective view of the invention showing the machine with the supply assembly receiving a pet roll of waste pads therein.
Figure 14:
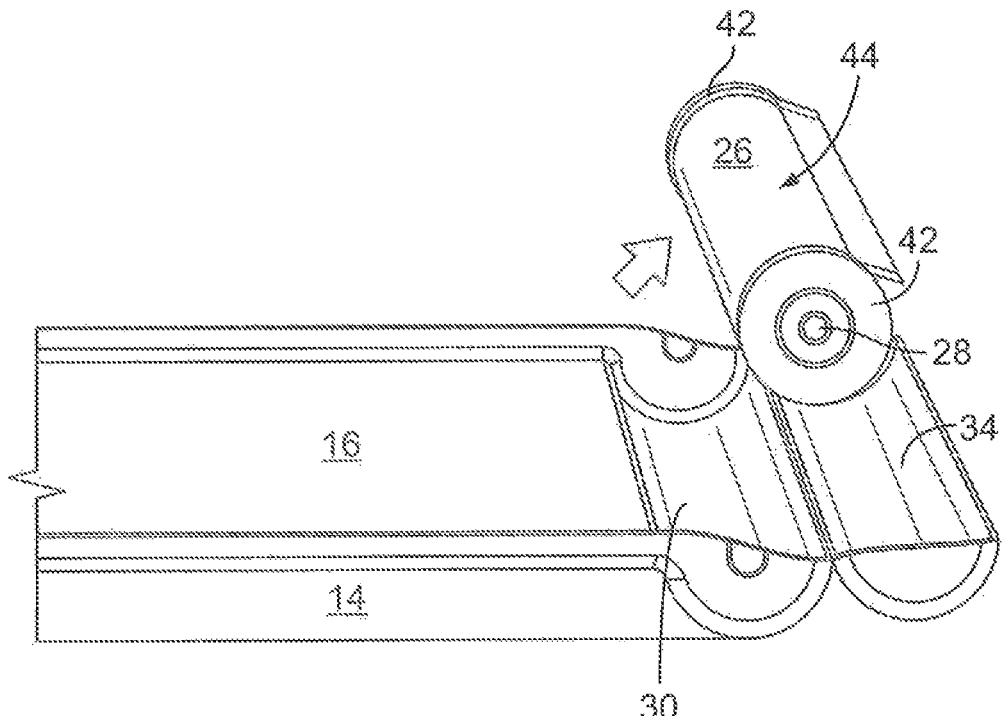
FIG. 14 is a diagrammatic perspective view of the invention showing the machine with the take-up assembly with the removal of the waste cartridge for disposal with the pet waste therein.
Figure 15:
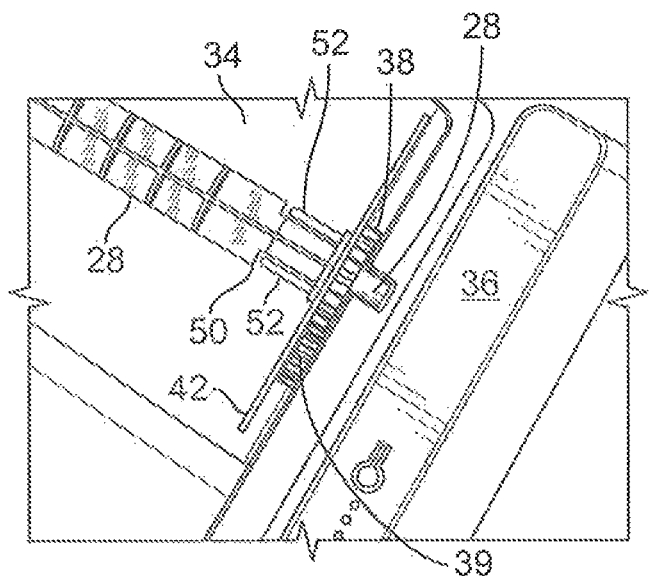
FIG. 15 is a diagrammatic perspective view of the invention showing the gearing and drive attachment of machine to the take-up assembly for receiving an end of pet roll of waste pads under a pair of clips at one end of the take-up rod.
Figure 16:
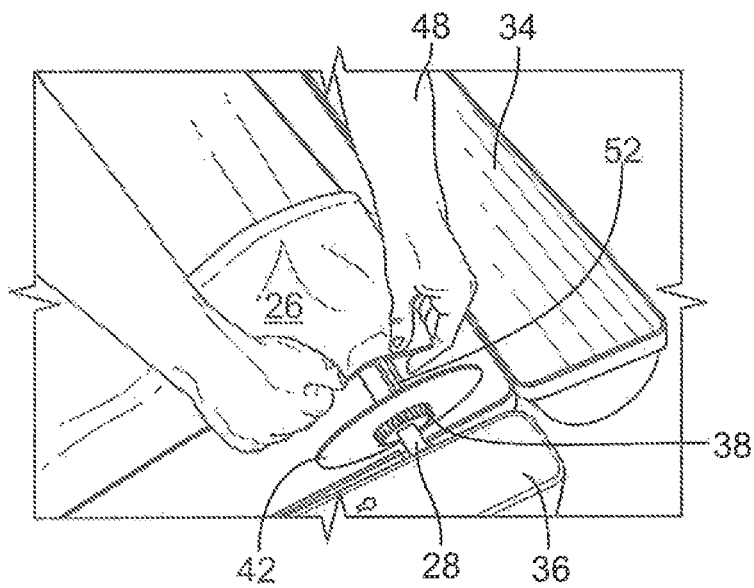
FIG. 16 is a diagrammatic perspective view of the invention showing the gearing and drive attachment of machine to the take-up assembly for receiving an end of pet roll of waste pads under a pair of clips at one end of the take-up rod and showing attachment of the one end of the pad to the clip.
Figure 17:
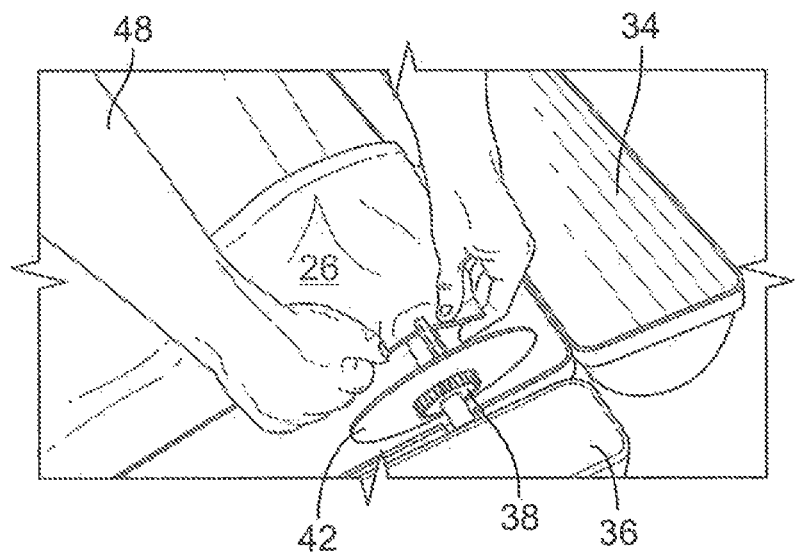
FIG. 17 is a diagrammatic perspective view of the invention showing the attachment of the one end of the pad to the clip.
Figure 18:
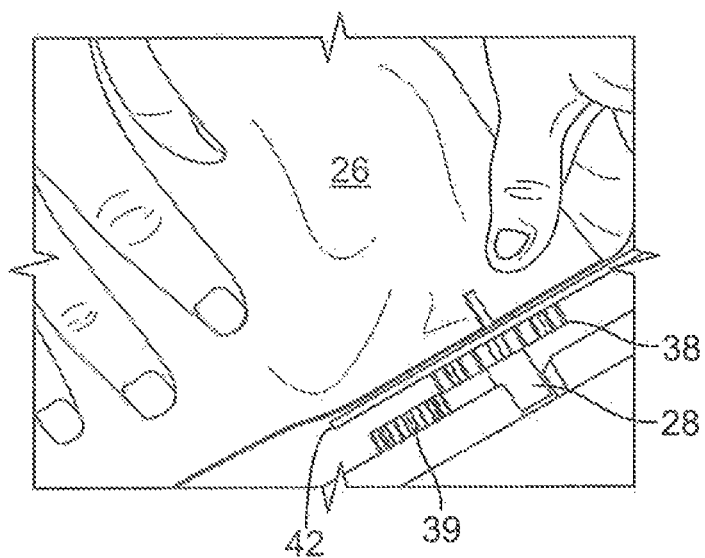
FIG. 18 is a diagrammatic perspective view of the invention showing the meshing of the gear on the end cap to the drive gear on the control and drive module.

FIG. 18 shows the meshing of identical tooth gears 38 on the end cap and gear drive on the removable control and drive module 36 during installation of the take-up rod 28 in the take-up assembly 20. FIGS. 6 and 7 show the removable control and drive module 36 that is used to program the movement of the pad across the bed 16 of the machine 14. In operation, the waste cartridge with its pad roll 26 is inserted into the supply assembly 18 while its take-up rod 28 attached to one end of pad is inserted into the take-up assembly 20 with a portion of the pad 12 stretched across the pet bed 16.

Then the covers of the supply and take-up 32 and 34, respectively, are closed and the waste machine is ready to accept its first dog or other pet for the elimination of its waste.

A roll of pet waste paper 26 for use with a pet waste machine 14 comprises an absorbent front side material on a roll of pet waste paper and a nonabsorbent back side material on the roll of waste paper or waste pad. Further, the waste paper or pad includes an absorptive non-woven spun bond on a top layer for tear resistance, an absorbent polymer in a middle layer and a plastic non-absorbent bottom layer for leak protection from the liquid and solid waste. The pet waste paper may also include an air laid paper top layer allowing the removal of other layers. The pet waste paper is capable of being configured to include either a four or five layer construction with the mixing of absorbent and non-absorbent or non-permeable layers. It is possible to have single layer with absorbent and non-absorbent on opposing sides of the single layer.

FIGS. 27-30 shows the infrared sensors on the machine or apparatus for detecting the marking on the waste paper or pads passing over the infrared sensor 264. The pet sensor beam 262 is used to detect the presence of a dog on the waste station or platform of the apparatus and if the dog is sensed, a programmed operation will not occur. There is a lower infrared sensor 264 on the control module for sensing the paper markings as the paper passes from the supply housing across the waste bed to the take up housing on the rod reel therein. The paper markings 268 help to determine the information necessary to determine paper advancement, remaining paper left on a roll of pads and when the end of the roll of pads is about to occur.

The paper or pad is generally composed of five layers but may be as little as just one layer too. The top sheet 270 is a bonded layer to prevent dog paws from ripping the paper. The next layer is a tissue layer 272 that helps to absorbed the liquids from the dogs urination. The layer 274 is the super absorbent polymer layer that helps absorb both the liquid urination and anything off of the solid deposit from the dog's defecation. Next comes another tissue layer 276 for further liquid absorption and finally the bottom layer 278 is made of a plastic or similar non-absorbent or impervious to liquids to prevent any other urine or solids to leak through the rolled up soiled roll of pads ready for removal and deposit before a fresh supply of roll of pads is installed in the supply and connected to the rod assembly in the take up housing.

We claim:

1. An apparatus having predetermined cycles for automatically removing pet waste, comprising:
   a pet waste platform including an aperture;
   a roll of pads;
   a supply housing for holding a fresh portion of the roll of pads located at a first end of a length of the platform,
      wherein a bottom surface of the roll of pads comprises a plurality of sensor-readable marks,
      wherein the supply housing comprises a bottom portion of the supply housing disposed below the waste platform and a cover top portion of the supply housing configured to secure the fresh portion of the roll of pads within the supply housing;
   a take up housing for receiving a soiled portion of the roll of pads located at a second end of the length of the platform, wherein the take up housing comprises a bottom portion of the take up housing disposed below the waste platform and a cover top portion of the take up housing configured to seal the soiled portion of the roll of pads within the take up housing;
   a take up assembly comprising a rod, wherein the rod is configured to attach to an end of the fresh roll of pads in the take up housing for winding the soiled portion of the roll of pads around the rod in the take up assembly; and
   a control and drive module removably coupled to the apparatus,
      wherein the control and drive module comprises a mark sensor below the platform configured to read the plurality of sensor-readable marks on the bottom surface of the roll of pads through the aperture on the platform located between the mark sensor and the bottom surface of the roll pads,
      wherein the mark sensor is further configured to track a position of a portion of the pad on the roll and determine the amount of pads remaining on the roll;
      wherein the control and drive module is configured to actuate the rod for advancing the soiled portion of the roll of pads across the waste platform in a predetermined manner;
      wherein the roll of pads exits the supply housing at a supply level below a horizontal surface of the pet waste platform and is taken up at a take up level below the horizontal surface of the pet waste station in the take up housing.

2. The apparatus of claim 1, wherein the control and drive is configured to be activated by an end user using a device communicatively coupled to the control and drive module wherein the device is selected from the group consisting of: a pushbutton on the control and drive module, a remote control, a near field communications device, a home automation system, a Smartphone, and an Internet connected device.

3. The apparatus of claim 1, comprising a sensor capable of detecting a presence of an animal for scheduling a movement of the roll of pads across the pet waste platform.

4. The apparatus of claim 3, wherein the sensor detects pet waste on the roll of pads across the waste platform to activate removal of the soiled portion of the roll of pads and replace the soiled portion of the roll of pads with the fresh portion of the roll of pads.

5. The apparatus of claim 1, comprising a pair of end caps coupled to each end of the rod to seal in the pet waste contained within the roll of pads wound around the rod.

6. The apparatus of claim 5, wherein the control and drive module comprises a drive shaft with a shaft gear on a distal end of the drive shaft, wherein at least one of the pair of end caps includes an end cap gear to mesh with the shaft gear configured to actuate the rod, wherein the rod actuates in a rotation capable of winding up the soiled pads around the rod.

7. The apparatus of claim 6, wherein the control and drive module comprises:
   a motor configured to activate the shaft gear and actuate the rod; and
   pushbuttons to control the motor in a predetermined way in order to control the movement of the roll of pads across the waste platform.

* * * * *